Sept. 19, 1961        I. L. McADA        3,000,128
MECHANIZED WATERFOWL DECOY
Filed Oct. 6, 1958
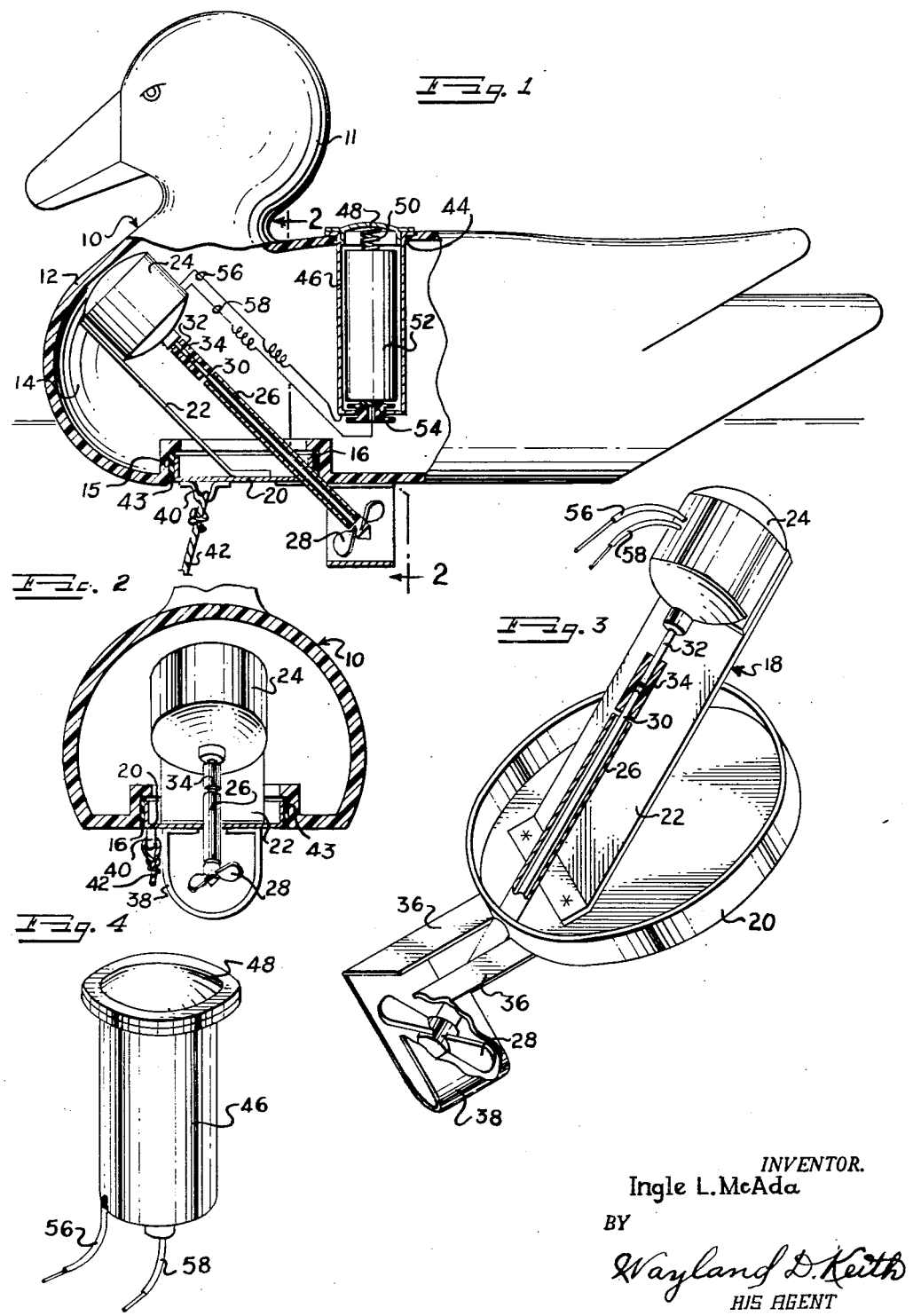
INVENTOR.
Ingle L. McAda
BY
Wayland D. Keith
HIS AGENT United States Patent Office 3,000,128
Patented Sept. 19, 1961

3,000,128
MECHANIZED WATERFOWL DECOY
Ingle Lee McAda, 3219 Miami, Wichita Falls, Tex.
Filed Oct. 6, 1958, Ser. No. 765,398
9 Claims. (Cl. 43—3)

This invention relates to a waterfowl decoy and more particularly to a self-propelled waterfowl decoy which will swim in a prescribed course, regardless of the drift caused by normal winds and waves.

The present device is so constructed that it requires the minimum number of working parts and the minimum amount of mechanism to produce a maximum of maneuverability of the decoy, to obtain the nearest approach to the actual movement of the waterfowl to attract waterfowl.

An object of this invention is to provided a waterfowl decoy for the decoying of waterfowl, such as ducks, geese, or other game waterbirds, by the movement of the decoy over the surface of the water.

Another object of the invention is to provide a self-propelled waterfowl decoy which has a minimum of operating parts and which is sturdy in construction, readily assembled and disassembled, and which is low in the cost of manufacture, and which will give service over a long period of time with a minimum of attention.

Still another object of the invention is to provide, for a waterfowl decoy, a propelling mechanism which is of unitary construction, so as to enable the ready conversion of conventional decoys into the self-propelled decoy in a minimum of time and at minimum expense.

A still further object of the invention is to provide in a waterfowl decoy an electrically driven propeller which will present a turbothrust action to the decoy through the water at a point forward of the gale line, so as to enable the decoy to be moved into the wind and waves.

Still another object of the invention is to provide a self-propelled waterfowl decoy which may be anchored in such manner that the propeller will not become entangled in the anchor line.

Yet another object of the invention is to provide a propeller shaft tube, the upper end of which, when installed in a waterfowl decoy, is located above the normal water line.

With these objects in mind and others which will become manifest as the description proceeds, reference is to be had to the accompanying drawings in which like reference characters designate like parts in the several views thereof, in which:

FIG. 1 is a side elevational view of the waterfowl decoy with parts broken away and with parts shown in section, to bring out the details of construction, with the water line being shown in dashed outline;

FIG. 2 is a sectional view taken on the line 2—2 of FIG. 1, looking in the direction indicated by the arrows;

FIG. 3 is a perspective view of the power unit removed from the decoy, and showing parts as broken away and parts being shown in section, to show the details of construction; and FIG. 4 is an enlarged perspective view of the battery case shown apart from the decoy.

With more detailed reference to the drawing, the numeral 10 designates generally a waterfowl decoy, which, in the present instance, has been illustrated in the form of a duck, which decoy is preferably made of papier-mache, plastic or other suitable material of great buoyancy.

The decoy is composed of a shell 12 which forms a hollow portion 14. The lower portion of the shell 12 has an opening 16 formed therein, which is usually closed by a disc-like plug (not shown).

A removable power unit 18 comprises a cylindrical cap or lid member 20, which member 20 forms a mounting base for the propeller mechanism. A bracket 22 is secured to the upper side of the lid member and extends upward at an angle to form a mounting support for motor 24. The lid member 20 has a tube 26 extending therethrough in sealed relation therewith, so as to form a water-tight closure. The tube 26 extends from a point below the lid member 20 to a point above the normal water line, when the unit is mounted within the hollow portion 14 of the decoy 10, as will be more fully set out hereinafter.

A screw type propeller 28 is mounted on a propeller shaft 30 and extends upward within tube 26 to a point above the upper end thereof so as to be in axial alignment with the shaft 32 of motor 24. A plastic sleeve coupling means 34 is provided, which sleeve is sufficiently flexible to give universal driving action between the motor shaft 32 and the propeller shaft 30, even through a slight misalignment of the shafts should occur during the assembly of the unit. The plastic sleeve 34 is slightly smaller in internal diameter than the propeller shaft 30 or the motor shaft 32, so as to form friction engagement therewith when the respective shafts are forced into the plastic sleeve, as the sleeve will yield sufficiently to admit these shafts.

Brackets 36 are made of a formable material, which brackets extend outward from lid member 20 and have a U-shaped guard member 38 extending downward therefrom and therebetween, to surround the sides and lower portion of the propeller 28. An anchor loop 40 is secured to the lower face of the lid member 20 forward of the propeller and in offset relation with respect to a medial, longitudinal, upright plane passing through the body of the decoy and through the normal axis of the propeller shaft. An anchor line 42 is secured to the anchor loop 40 and to an anchor (not shown). The anchor line 42 is of sufficient length to enable the decoy to navigate in a predetermined path, with the anchor line forming the radius of the path.

The U-shaped guard member 38 is semi-cylindrical at the lower portion thereof, which semi-cylindrical portion serves to guard the anchor line to prevent it from becoming entangled with the propeller 28. Furthermore, the guard 38 surrounds the propeller in such manner as to prevent the propeller from striking an object submerged beneath the water, which guard 38 also serves as a water tunnel to change the direction of the flow of water from an axially aligned relation with respect to the propeller shaft to a horizontally directed flow immediately below the body of the decoy to give greater propelling power to the decoy.

The cap or lid member 20 has a sealing ring 43 therearound and is of a size to form a water-tight closure with the upstanding rim portion 15, which forms the opening 16 in the lower side of the shell of the decoy 10. An opening 44 is formed in the upper side of the shell 12 of the decoy, to telescopically receive a cylindrical battery housing 46, which housing is preferably made of metal and has a metal cap 48 on the upper end thereof, which forms a tight closure with the housing 46. A spring 50 is secured to the cap 48 and extends downward into electrical contact engagement with one pole of a battery 52, which is fitted within the housing 46. The other pole of the battery is in contact relation with a contact 54 which is insulated from shell 46. The wires 56 and 58 are connected to and extend from the housing 46 and contact 54, respectively, to connect with the motor 24, to supply electrical current to motor 24. Wires 56 and 58 are of sufficient length to enable the removal of the removable power unit 18 from the decoy, so that the wires may be readily connected to the motor exteriorly of the decoy. It is preferable to make the unit 18 so that the motor 24 will extend upward into the hollow portion of the body of the decoy, until the motor 24 is approximately in contact relation with the forward inner shell portion 12 of the decoy.

Assembly

The present device is unitized into two primary units, which may be assembled into a decoy without the necessity of building the mechanism into a specific decoy body to house and support the individual elements of the mechanism.

The present arrangement makes possible the use of a conventional decoy, from which the conventional plug (not shown) is removed. The conventional plug closes the hole 16 in the bottom of the body of the decoy. The removal of the conventional plug will permit the insertion of the lid or cap member 20 into the opening 16, with the sealing ring 43, such as a rubber gasket or the like forming a water-tight seal between the cap or lid 20 and the circumference of the opening 16, or the member 20 may be sealed in place by mastic cement or the like, so that water will not leak into the hollow housing 14 of the decoy. A hole, substantially of the size of the outer diameter of the cylindrical battery housing 46, is drilled in the upper portion of the decoy body immediately to the rear of the said head 11. The housing 46 is fitted into the hole 44. A battery 52 is inserted into the housing 46 so that contact 54 will contact one pole of the battery and the spring 50 will form an electrical contact with the other pole of the battery. Upon placing the cap 48 so that the spring 50 will contact the pole of the battery, the motor 24 will start, whereupon, the decoy may be placed in the water and be propelled in a course determined by the length of the anchor line 42. The motor may be turned off by the removal of the cap 48.

When the composite power and propelling unit is mounted on cap member 20, the propeller 28 will lie in a transverse plane passing through the decoy, so that the portion of the decoy rearward of this transverse line, which has been termed the gale line, will present a greater exposed surface area to the wind than the portion forward of this transverse line, therefore, with the propelling power being applied on or forward of this line, the decoy will be pulled through the water, and the wind will act upon the portion rearward of the transverse line passing through the propeller in such manner that the body of the decoy will normally head into the wind and the waves produced thereby.

While the invention has been illustrated and described in some detail in one embodiment thereof, it is to be understood that changes may be made in the minor details of construction for different installations, without departing from the scope of appended claims or the spirit of the invention.

Having thus clearly shown and described the invention, what is claimed as new and desired to be secured by Letters Patent is:

1. A composite, attachable propelling mechanism for a waterfowl decoy having a hollow, buoyant body portion with an opening formed in the bottom thereof, which mechanism comprises a closure member adapted to complementally fit into said opening in fluid tight relation, an electric motor mounted on said closure member on the upper side thereof, a shaft extending outward from said motor, a tube extending through said closure and forming a fluid tight joint therewith, said tube being in substantially axial alignment with the axis of the shaft of said motor, said tube extending into said hollow, buoyant body portion of said decoy to a point above the normal water line when said decoy is floating on water, a propeller shaft, which propeller shaft extends downwardly and rearwardly through said tube and being in axial alignment with the shaft of said motor, coupling means connecting said motor shaft and said propeller shaft within said tube, a screw type propeller secured to said propeller shaft exterior of the outer end of said tube, a battery mounted in said body portion, and an electrical circuit connecting said motor and said battery.

2. A device as defined in claim 1, wherein said propeller shaft is positioned at an acute angle with respect to said closure, and which propeller shaft extends to a point rearward of said closure, brackets secured to said closure exteriorly thereof and extending rearward therefrom, and formable material secured to said brackets and extending downward therefrom to surround said screw type propeller in such manner as to form a tunnel therearound, the axis of which tunnel and the axis of said propeller shaft lying in a common plane.

3. A device as defined in claim 2; wherein said propeller is located forward of a medial plane passing transversely through the body of said decoy.

4. A device as defined in claim 2, wherein said propeller is located forward of the gale line of the body portion of said waterfowl decoy.

5. A device as defined in claim 1, wherein said closure member is circular in form and is fitted within said opening formed in said hollow, buoyant body portion of said waterfowl decoy.

6. A device as defined in claim 1, wherein an anchor member is secured to the bottom of said closure forward of a medial plane passing transversely therethrough and in off-set relation to a side of a longitudinal plane passing therethrough.

7. A propelling mechanism for a waterfowl decoy comprising; a closure member, a bracket secured to said closure member and extending upward therefrom at an acute angle with respect thereto, an electric motor mounted on said bracket, a shaft extending downward from said motor, a tube extending downwardly through said closure member and forming a fluid tight joint therewith, said tube being in substantial alignment with the axis of the shaft of said motor, a propeller shaft connected to said motor shaft in driving relation, which propeller shaft extends downward through said tube, a screw type propeller secured to said propeller shaft at the lower end thereof, a pair of brackets secured to said closure member, one on each side thereof and extending outward in a plane parallel to the plane in which the lower face of said closure lies, a guard member of formable material secured to said brackets and extending downward to form a tunnel around said propeller, and electrical supply means connected to said motor.

8. A device as defined in claim 1; wherein an upstanding bracket is provided, which bracket is secured to said closure member on the upper side thereof and on which bracket said electric motor is mounted.

9. A composite, attachable propelling mechanism for a waterfowl decoy having a hollow, buoyant body portion with an opening formed in the bottom thereof, which mechanism comprises; a closure member adapted to complementally fit into said opening in fluid tight relation, an electric motor mounted on said closure member on the upper side thereof, a shaft extending outward from said motor, a tube extending through said closure and forming a fluid tight joint therewith, said tube being in substantially axial alignment with the axis of the shaft of said motor, said tube extending into said hollow, buoyant body portion of said decoy to a point above the normal water line when said decoy is floating on water, a propeller shaft, which propeller shaft extends downwardly and rearwardly through said tube and being in axial alignment with the shaft of said motor, which propeller shaft is positioned at an acute angle with respect to said closure member, coupling means connecting said motor shaft and said propeller shaft within said tube, a screw type propeller secured to said propeller shaft exterior of the outer end of said tube, a battery mounted in said body portion, an electrical circuit connecting said motor and said battery, and formable material secured to said closure member which extends downward therefrom to surround said screw type propeller in such manner as to form a tunnel therearound, the axis of which tunnel and the axis of said propeller shaft lie in a common plane.

References Cited in the file of this patent

UNITED STATES PATENTS

| | | |
|---|---|---|
| 647,101 | Mahler et al. | Apr. 10, 1900 |
| 1,444,342 | Godward | Feb. 6, 1923 |
| 2,070,172 | Nelson | Feb. 9, 1937 |
| 2,799,690 | Riley | July 23, 1957 |
| 2,814,146 | Propp | Nov. 26, 1957 |